(12) United States Patent
Muma

(10) Patent No.: US 8,157,685 B2
(45) Date of Patent: Apr. 17, 2012

(54) ENDLESS BELT WITH BINDER FOR CARCASS STABILITY

(75) Inventor: William T. Muma, Wentzville, MO (US)

(73) Assignee: Apache Hose & Belting Co., Inc., Cedar Rapids, IA (US)

( * ) Notice: Subject to any disclaimer, the term of this patent is extended or adjusted under 35 U.S.C. 154(b) by 429 days.

(21) Appl. No.: 12/416,755

(22) Filed: Apr. 1, 2009

(65) Prior Publication Data

US 2010/0251685 A1    Oct. 7, 2010

(51) Int. Cl.
*F16G 1/00* (2006.01)
(52) U.S. Cl. ......... 474/260; 474/261; 474/262; 474/263
(58) Field of Classification Search .......... 474/260–263, 474/266
See application file for complete search history.

(56) References Cited

U.S. PATENT DOCUMENTS

| | | |
|---|---|---|
| 1,412,309 A | 4/1922 | Lambert |
| 2,113,561 A | 4/1938 | Freedlander |
| 2,582,366 A | 1/1952 | White |
| 2,630,603 A | 3/1953 | Freedlander et al. |
| 3,047,446 A | 7/1962 | Henson |
| 3,076,736 A | 2/1963 | McHugh |
| 3,101,290 A | 8/1963 | Paul |
| 3,144,930 A | 8/1964 | Michels |
| 3,395,529 A | 8/1968 | Ray |
| RE26,731 E | 12/1969 | Robinson |
| 3,485,707 A | 12/1969 | Spicer |
| 3,582,154 A | 6/1971 | Russ, Sr. |
| 3,820,409 A | 6/1974 | Meadows |
| 3,911,755 A | 10/1975 | Vance, Sr. |
| 3,941,005 A | 3/1976 | Gardiner, III et al. |
| 3,944,060 A | 3/1976 | Hartmann |
| 3,949,799 A | 4/1976 | Montagne |
| 3,996,813 A | 12/1976 | Henderson et al. |
| 4,004,467 A | 1/1977 | Kenney |
| 4,094,402 A | 6/1978 | Heeke |
| 4,224,370 A | 9/1980 | Heinemann |
| 4,279,676 A | 7/1981 | Morrison et al. |
| 4,371,580 A | 2/1983 | Morrison et al. |
| 4,555,241 A | 11/1985 | Takano et al. |
| 4,650,068 A | 3/1987 | Vanassche et al. |
| 4,721,498 A | 1/1988 | Grob |
| 4,937,925 A | 7/1990 | McGee, Jr. |
| 5,211,609 A | 5/1993 | Haines |
| 5,244,436 A | 9/1993 | Kurokawa |
| 5,298,956 A | 3/1994 | Mammino et al. |

(Continued)

FOREIGN PATENT DOCUMENTS

JP    4000039    1/1992

(Continued)

OTHER PUBLICATIONS

PCT/US07/087847 PCT International Search Report dated Jun. 25, 2008, 3 pages, United States.

*Primary Examiner* — Sang Kim
(74) *Attorney, Agent, or Firm* — Senniger Powers LLP

(57) ABSTRACT

An endless elastomeric belt includes a carcass that includes an elastomeric matrix extending in an endless loop around a circumference of the belt. The matrix has opposite lateral edges defining a width of the matrix, and a carcass cord within the matrix extending in multiple turns around the circumference of the belt. An elongate binder extends around the lateral edges of the matrix generally transverse to the centerline of the body.

20 Claims, 14 Drawing Sheets

U.S. PATENT DOCUMENTS

| | | |
|---|---|---|
| 5,409,557 A | 4/1995 | Mammino et al. |
| 5,516,391 A | 5/1996 | Schanin et al. |
| 5,519,990 A | 5/1996 | Rodewald et al. |
| 5,521,007 A | 5/1996 | Kurokawa |
| 5,573,619 A | 11/1996 | Benedict et al. |
| 5,575,729 A | 11/1996 | Feldmann et al. |
| 5,578,096 A | 11/1996 | Christianson et al. |
| 5,599,604 A | 2/1997 | Goettsch et al. |
| 5,609,706 A | 3/1997 | Benedict et al. |
| 5,632,701 A | 5/1997 | Neel |
| 5,705,446 A | 1/1998 | Fujishiro et al. |
| 5,830,248 A | 11/1998 | Christianson et al. |
| 6,235,133 B1 | 5/2001 | Sato |
| 6,406,577 B1 | 6/2002 | Benedict et al. |
| 6,632,151 B1 | 10/2003 | Knutson |
| 6,739,996 B2 | 5/2004 | Ueno et al. |
| 6,827,660 B2 | 12/2004 | Love et al. |
| 6,945,892 B2 | 9/2005 | Knutson |
| 2003/0017900 A1 | 1/2003 | Kopang |
| 2003/0073533 A1 | 4/2003 | Knutson |
| 2003/0078125 A1 | 4/2003 | Knutson |
| 2004/0048709 A1 | 3/2004 | Knutson |
| 2008/0153647 A1 | 6/2008 | Muma et al. |

FOREIGN PATENT DOCUMENTS

| | | |
|---|---|---|
| JP | 04118307 A | 4/1992 |
| JP | 6107311 | 4/1994 |
| JP | 8067318 | 3/1996 |
| JP | 9100043 | 4/1997 |
| JP | 63222847 | 9/1998 |
| WO | 0017074 A1 | 3/2000 |

ENDLESS BELT WITH BINDER FOR CARCASS STABILITY

FIELD OF THE INVENTION

The present invention generally relates to an endless elastomeric belt.

BACKGROUND OF THE INVENTION

Endless elastomeric belts are used in hay balers, more specifically round hay balers, to compress and roll hay into compact cylindrical bundles. The belt is considered "endless" because it is formed as a continuous loop without a transverse joint. Typically, several of these belts are received around a series of rollers inside the hay baler. The belts are driven along the rollers so that hay introduced into the baler is compressed and rolled by the belts. It is noted that both surfaces of the belts contact the rollers.

These belts typically include a carcass including one or more carcass cords extending around a circumference of the belt, and an elastomeric matrix in which the carcass cord(s) are embedded. During manufacture of the belt, it may be desirable to maintain a selected arrangement of the carcass cord(s) before the belt has been cured and during curing of the belt so that the carcass cord(s) in the completed belt has this selected arrangement.

SUMMARY OF THE INVENTION

In one aspect, an endless elastomeric belt generally comprises a body extending in an endless loop around a circumference of the belt. The body has a centerline extending around the circumference, and opposite lateral edges. A carcass in the body includes an elastomeric matrix extending in an endless loop around the circumference of the belt. The matrix has opposite lateral edges defining a width of the matrix, and a carcass cord within the matrix extending in multiple turns around the circumference of the belt. An elongate binder extends around the lateral edges of the matrix generally transverse to the centerline of the body.

In another aspect, a baler generally comprises a series of rollers driven about generally parallel rotational axes. An endless elastomeric belt is received around the rollers so that the rollers drive the belt in a direction of travel. The elastomeric belt comprises a body extending in an endless loop around a circumference. The body has a centerline extending around the circumference. A carcass includes an elastomeric matrix having opposite lateral edges defining a width of the matrix. First and second carcass cords are embedded in the matrix. The first and second carcass cords are wound generally along the direction of travel. Each carcass cord has a first end generally adjacent to a center of the width of the matrix and a second end generally adjacent to one of the edges of the matrix. Each carcass cord has a laterally outermost turn including the outer end. The laterally outermost turn of each carcass cord extends generally in the direction of the travel of the belt at a primary portion and extends at an angle with respect to the direction of travel at a transition portion. Each of the first ends of the carcass cords leads at least a part of the transition portion of the respective laterally outermost turn with respect to one of the rollers as the belt is driven on the rollers. An elongate binder extends around the lateral edges of the carcass generally transverse to the centerline of the body.

In yet another aspect, an endless elastomeric belt generally comprises a carcass including an elastomeric matrix extending in an endless loop around a circumference. The matrix has a centerline and opposite lateral edges. A first cord is generally within the matrix. The first cord is wound in a Z-direction along the circumference of the belt and has an inner end generally adjacent to the centerline of the matrix and an outer end generally adjacent to one of the opposite lateral edges of the matrix. The first cord comprises at least two threads wound in the Z-direction. A second cord is generally within the matrix. The second cord is wound in an S-direction along the circumference of the belt and has an inner end generally adjacent to the centerline of the matrix and an outer end generally adjacent to one of the opposite lateral edges of the matrix remote from the outer end of the first cord. The second cord comprises at least two threads wound in the S-direction. An elongate binder extends around the lateral edges of the carcass generally transverse to the centerline of the matrix.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
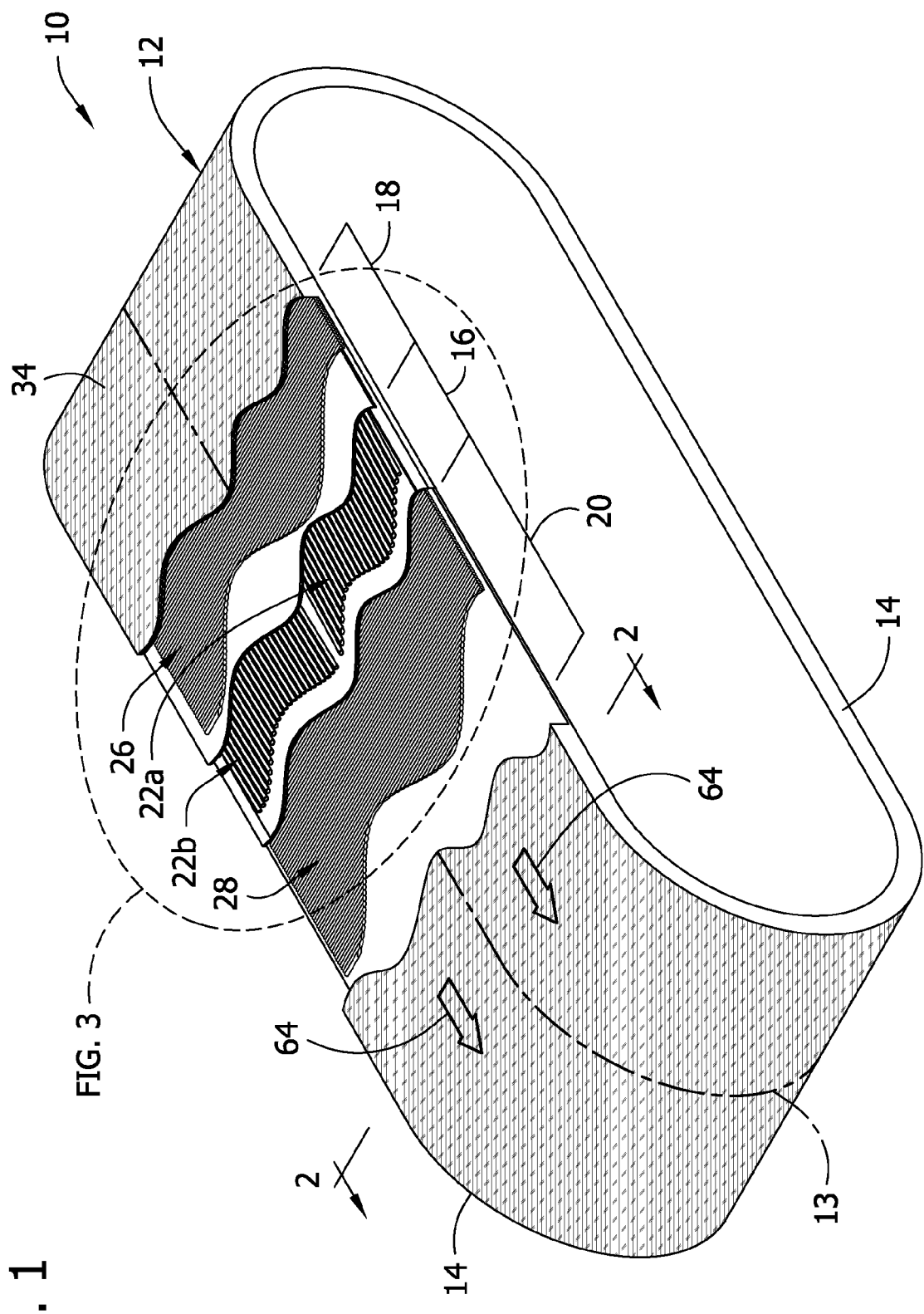
FIG. 1 is a perspective of a first embodiment of an endless elastomeric belt with parts broken away to show internal construction.
Figure 2:
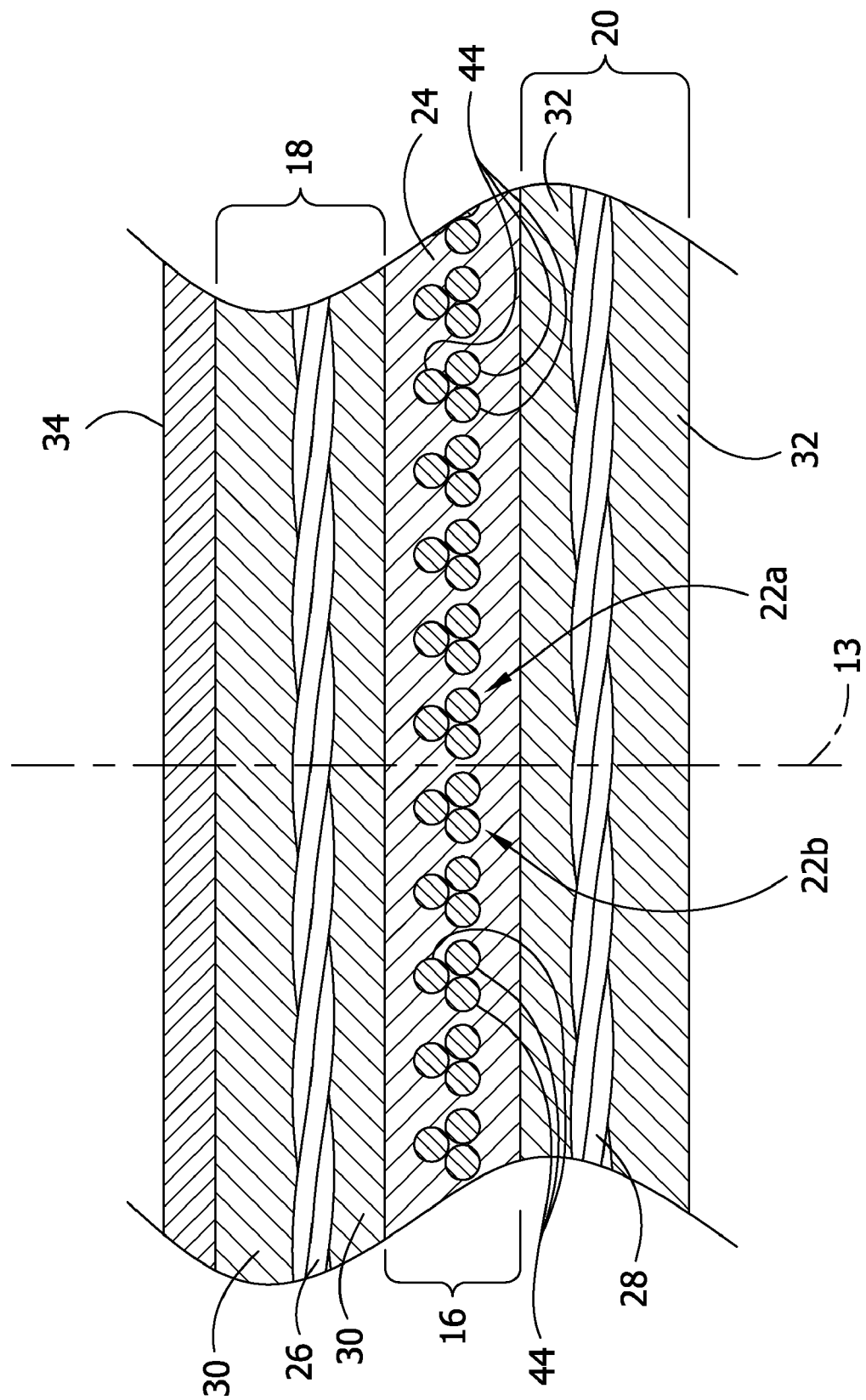
FIG. 2 is a fragmentary cross-section of the belt taken in the plane containing the line 2-2 of FIG. 1.
Figure 3:
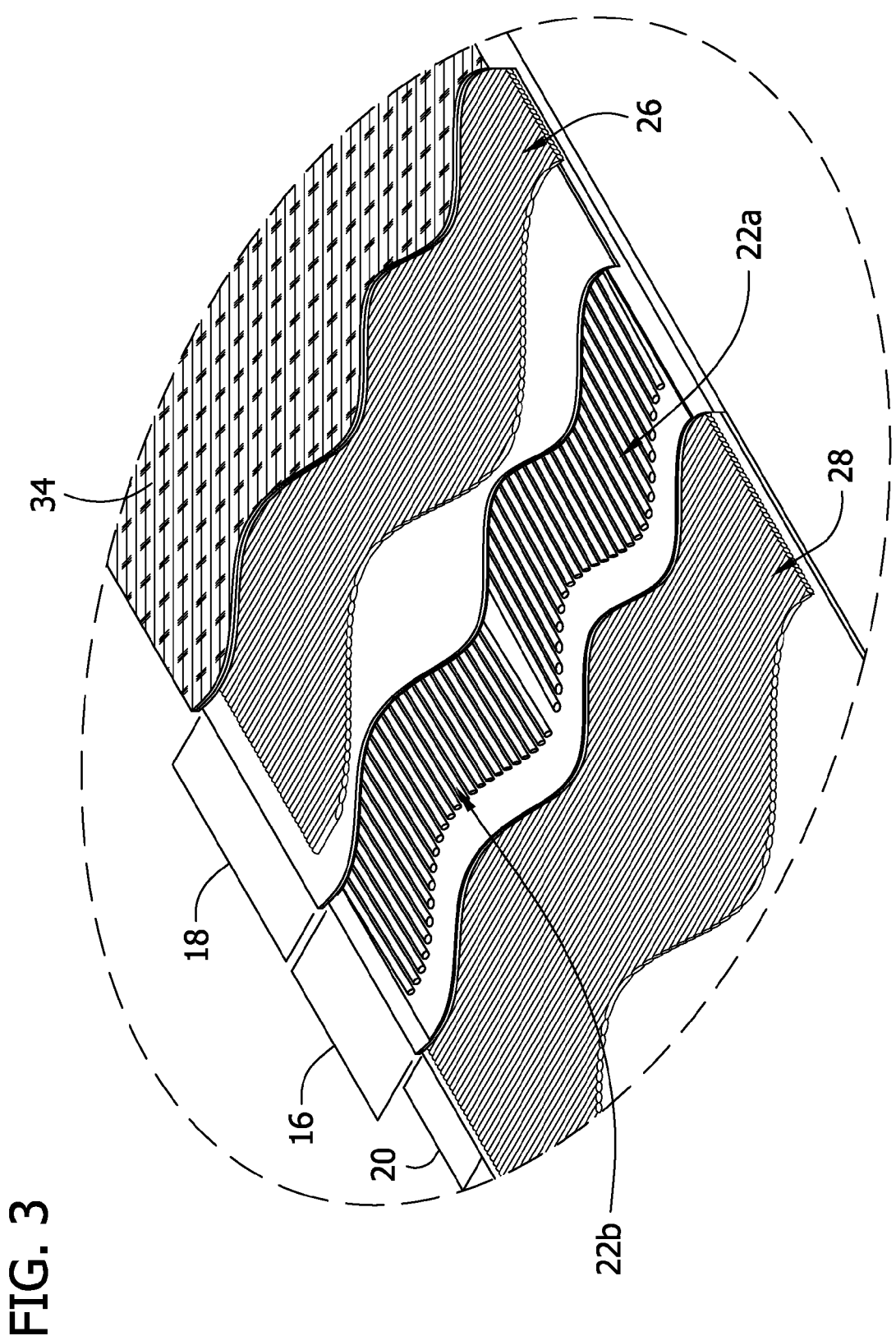
FIG. 3 is an enlarged fragmentary view of the belt in FIG. 1.
Figure 4:
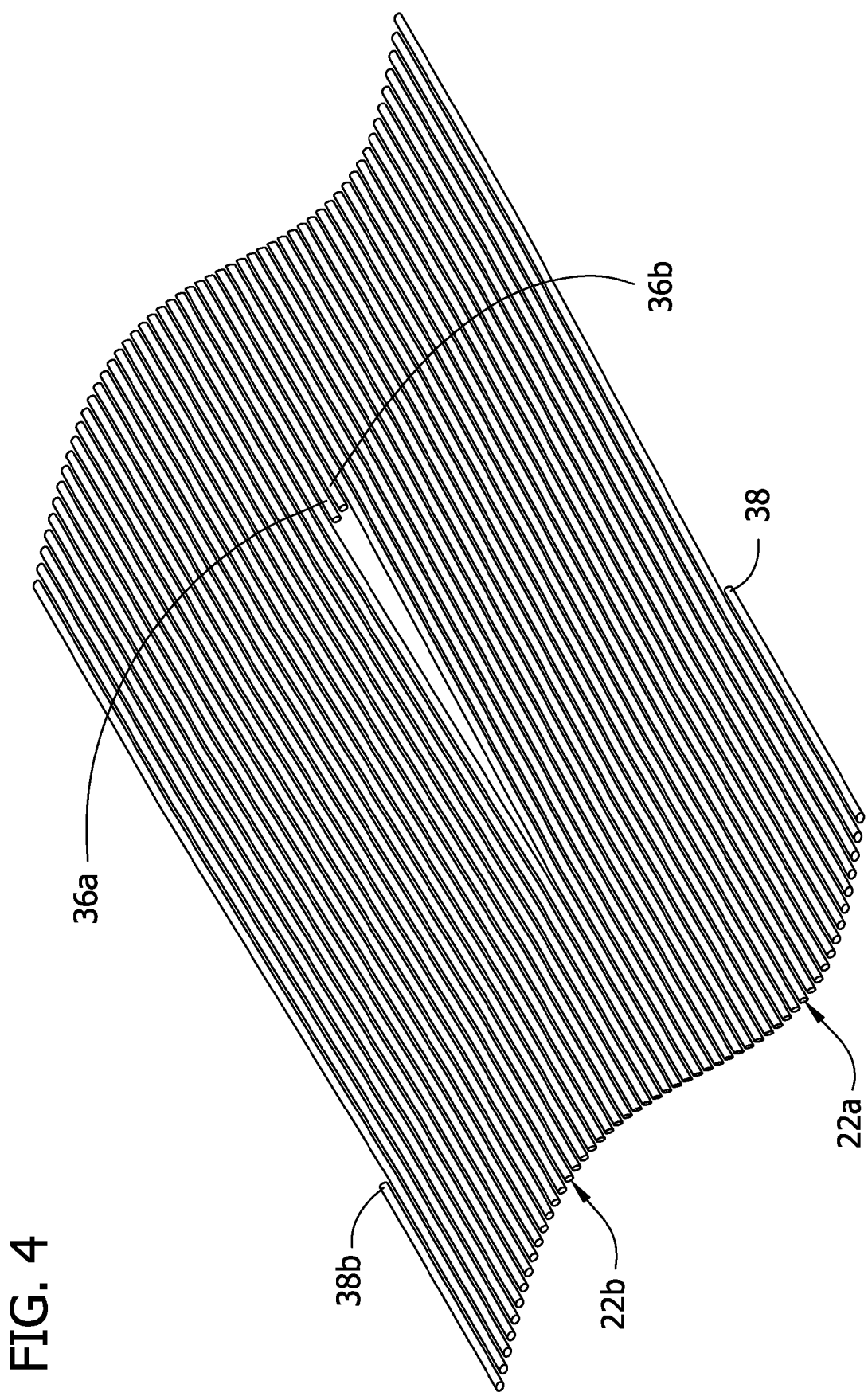
FIG. 4 is a fragmentary perspective of first and second carcass cords of the belt.

Referring now to the drawings, and in particular to FIGS. 1-3, one embodiment of a flexible, endless elastomeric baler belt constructed according to the principles of the present invention is generally indicated at 10. A body 12 of the belt 10 extends in an endless loop around a length or circumference of the belt. The body 12 has a centerline 13 along its length and opposite longitudinal edges 14. As shown best in FIG. 2, the belt 12 generally comprises a carcass 16 sandwiched between upper and lower transverse layers 18, 20, respectively. As explained in more detail below, the carcass 16 includes first and second carcass cords, generally indicated at 22a, 22b, respectively, embedded in an elastomeric matrix 24. The transverse layers 18, 20 include a plurality of respective upper and lower transverse cords 26, 28, respectively, each embedded in respective elastomeric matrices 30, 32, respectively. An upper surface 34 of the belt 10 has an embossed pattern for gripping hay as it is being bailed. It is to be understood that the belt 10 may have differences in construction from what is described herein without departing from the scope of the present invention.

Figure 5:
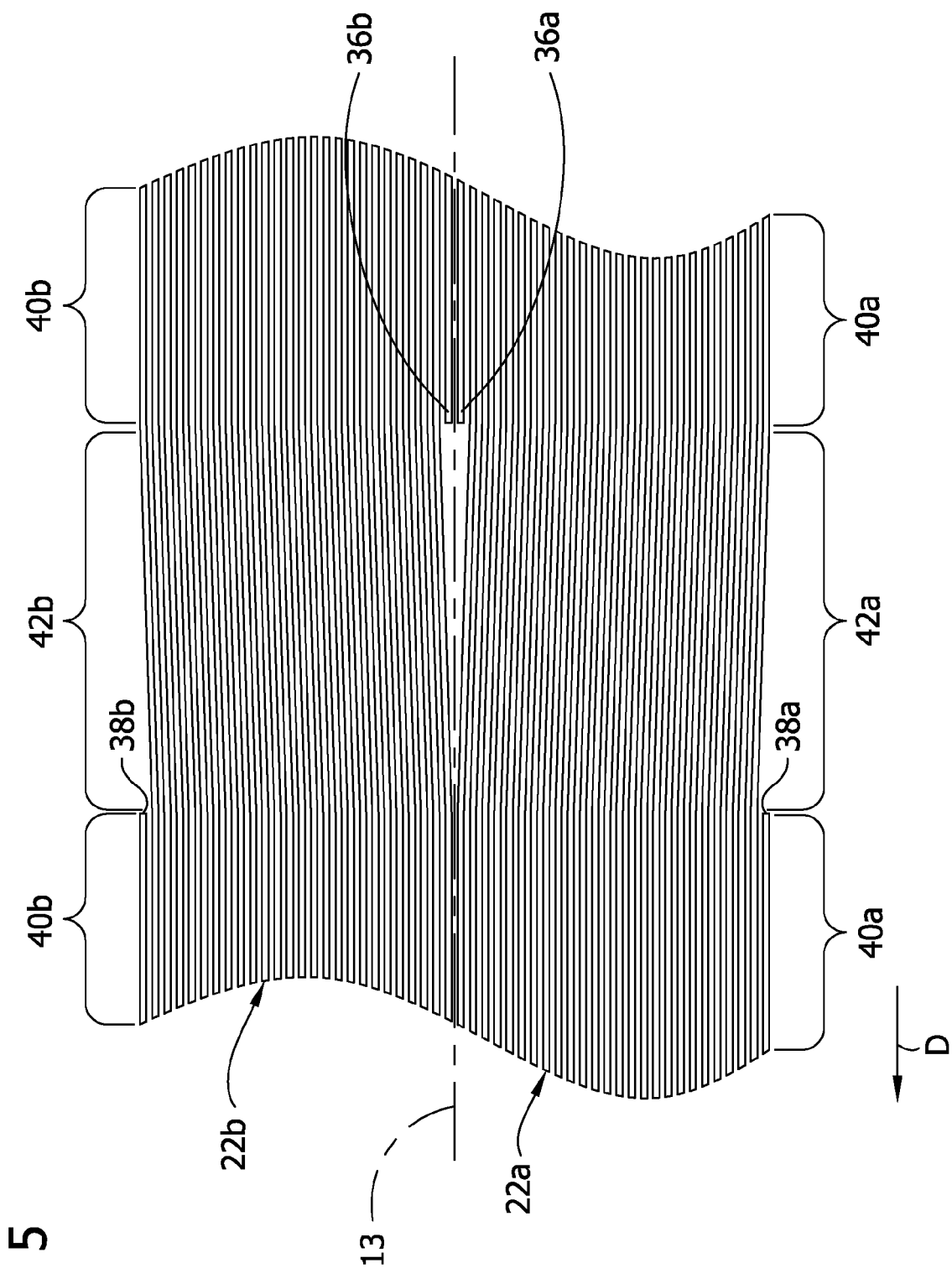
FIG. 5 is a top plan of the cords of FIG. 4.

Referring to FIGS. 1 and 3-5, the first and second carcass cords 22a, 22b are helically wound around the circumference of the belt 10 in multiple turns. As referred to herein, the term "turn" refers to a single complete (360°) turn of the respective cord around the length of the belt 10. The carcass cords 22a, 22b are wound so that inner ends 36a, 36b, respectively, of the cords are generally adjacent to the centerline 13 of the body 12 and outer ends 38a, 38b of the cords are generally adjacent to the respective longitudinal edges 14 of the body (see, FIG. 5). Referring specifically to FIG. 5, the multiple turns of the carcass cords 22a, 22b define first sections 40a, 40b, respectively, in which the cords extend substantially parallel to the centerline 13 of the body 12 and second sections 42a, 42b in which the cords extend at an angle to the centerline.

As will be understood by those of ordinary skill in the art, the carcass cords 22a, 22b are wound in different directions along the length of the belt 10. In the illustrated embodiment, the first cord 22a is wound in the Z-direction around the length of the belt 10, while the second cord 22b is wound in the S-direction around the length of the belt. It is understood that the cords 22a, 22b may be wound in directions other than shown in the drawings. For example, the first cord 22a may be wound in the S-direction, while the second cord 22b is wound in the Z-direction or each of the cords may be wound in the same direction (i.e., either the Z-direction or the S-direction).

Referring back to FIG. 2, each of the carcass cords 22a, 22b preferably comprises between about three and nine adhesive dipped polyester threads 44. Each of the threads comprises a plurality of yarns, such as between about 3 and about 9 adhesive dipped polyester yarns. It is understood that the cords 22a, 22b may comprise other types of threads besides or in addition to adhesive dipped polyester threads. As will be understood by those of ordinary skill in the art, the threads 44 of each cord 22a, 22b are spiraled either clockwise or counterclockwise to form the cord, making each cord either a Z-cord or an S-cord, respectively. Broadly, the carcass cords 22a, 22b are preferably wound in the same direction around the length of the belt 10 as the direction of the threads that constitute the cords. In other words, if a carcass cord is wound in the Z-direction around the length of the belt 10, then that carcass cord is preferably a Z-cord, and vice versa. Accordingly, in the illustrated embodiment the first carcass cord 22a is preferably a Z-cord because the first cord is wound in the Z-direction around the length of the belt 10, while the second cord 22b is preferably an S-cord because the second cord is wound in the S-direction around the length of the belt. Other configurations and arrangements of the cords 22a, 22b are within the scope of the invention.

Figure 6:
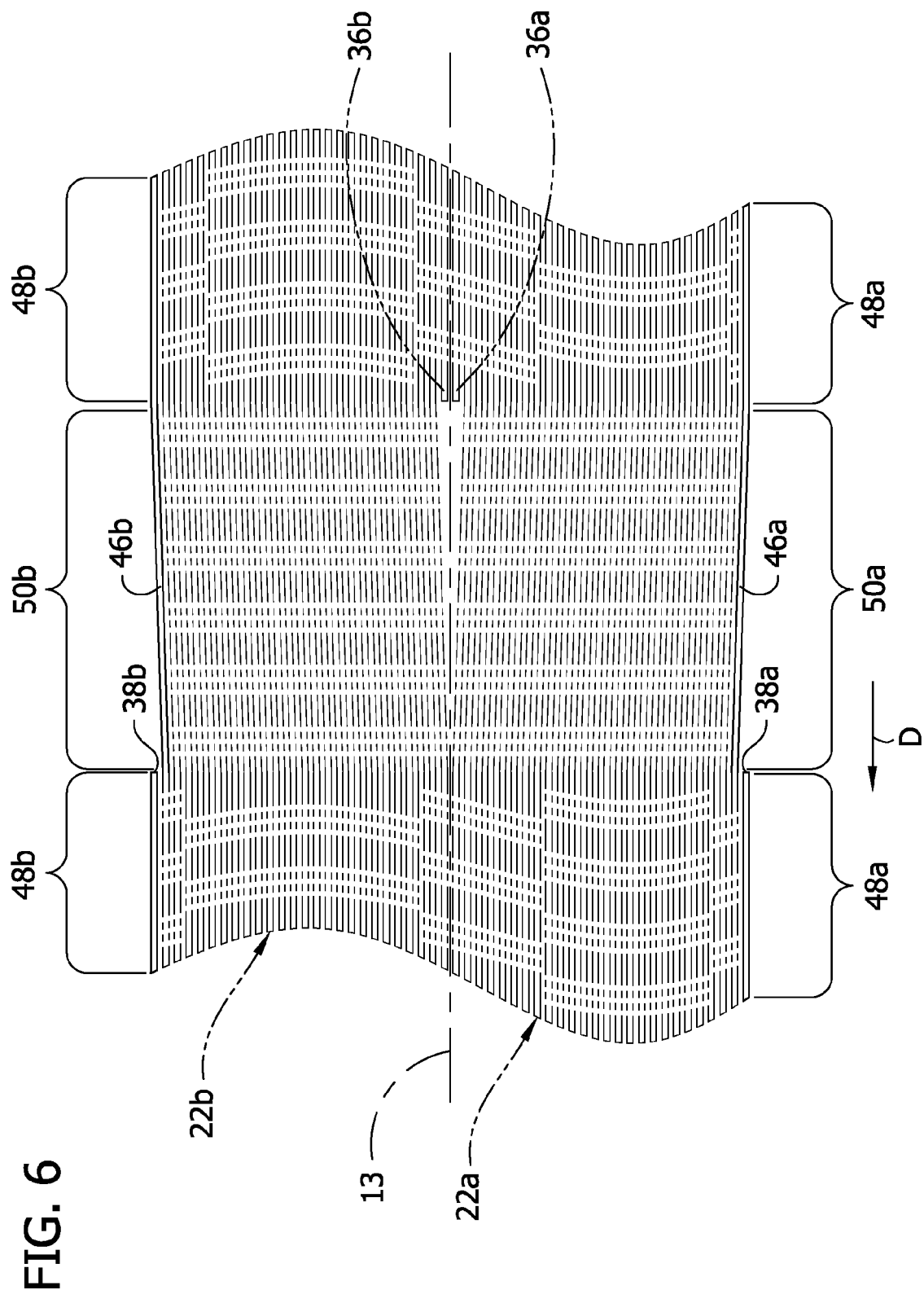
FIG. 6 is similar to FIG. 5 with the carcass cords being shown in phantom lines except for laterally outermost turns of the cords.

Referring to FIG. 6, laterally outermost turns 46a, 46b, respectively, of the carcass cords 22a, 22b, located nearest to respective longitudinal edges 14 of the body 12, contain the outer ends 38a, 38b of the cords. The laterally outermost turn 46a, 46b of each cord 22a, 22b includes a first portion 48a, 48b, respectively, in which the turn extends substantially parallel to the centerline 13 of the body 12, and a second portion 50a, 50b, in which the turn extends at an angle to the centerline. The outer end 38a, 38b of each carcass cord 22a, 22b is located in a position that is not laterally outward of the other portions of the laterally outermost turn 46a, 46b of the cord. More specifically, the outer end 38a, 38b of each cord 22a, 22b is part of the first portion 48a, 48b of the laterally outermost turn 46a, 46b so that the outer end is substantially aligned with a longitudinally opposing part of the laterally outermost turn. As explained in more detail below, in this way the outer end 38a, 38b of each cord 22a, 22b is effectively protected by the opposing part of the respective laterally outermost turn 46a, 46b.

Referring to FIGS. 1 and 2, the transverse cords 26, 28 of the upper and lower transverse layers 18, 20, respectively, are laid out side-by-side around the length of the belt 10 and extend transverse to the centerline 13 of the body 12. The upper and lower transverse cords 18, 20, respectively, may comprise tire cord #2200, or other cords composed of other material. The upper and lower elastomeric transverse matrices 28, 30, respectively, may be similar or identical to the carcass matrix 24.

Figure 7:
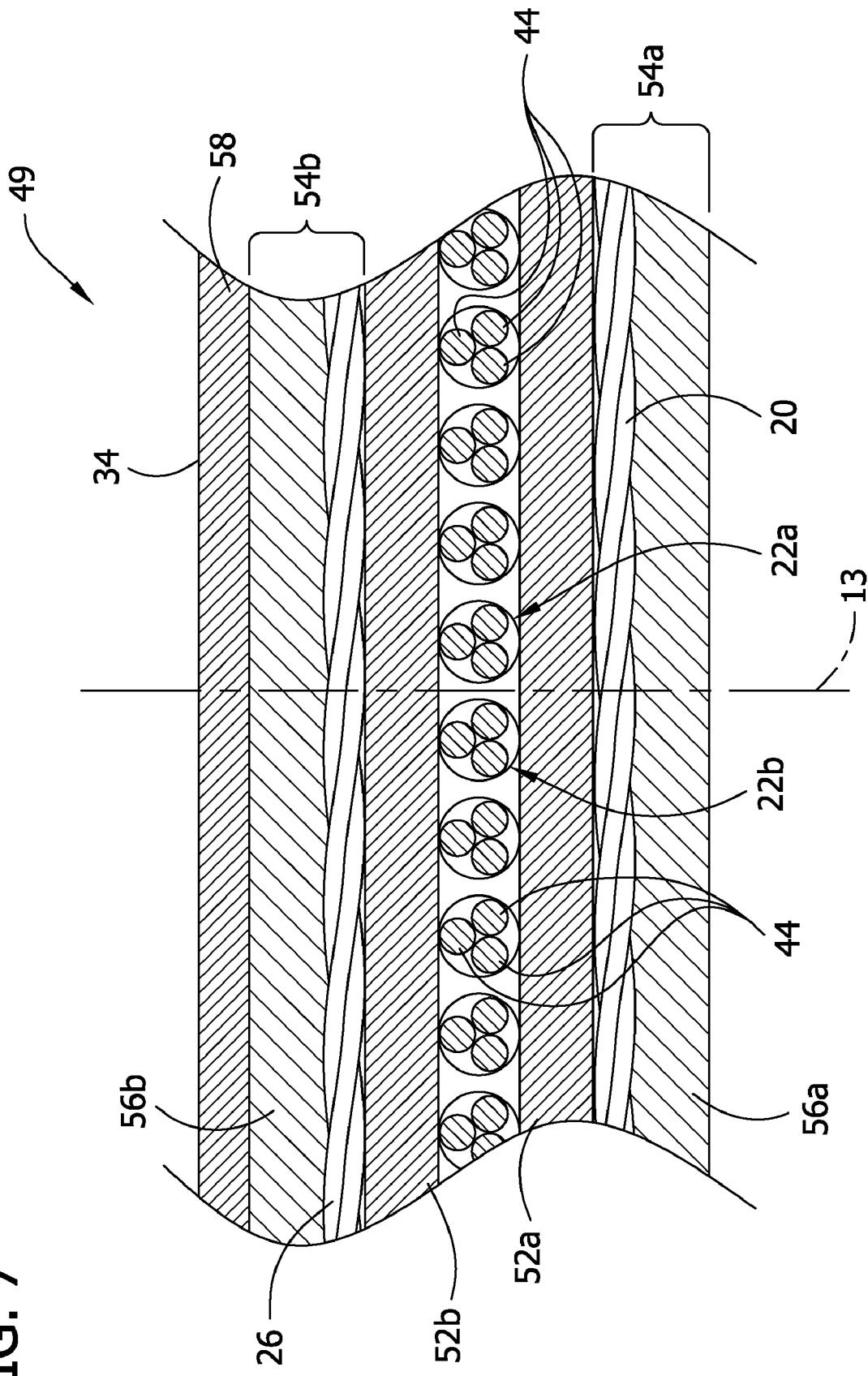
FIG. 7 is a fragmentary section of a subassembly of the belt.

Referring to FIG. 7, in one example of a method of making the belt 10, a belt subassembly, generally indicated at 49, is formed. The first and second carcass cords 22a, 22b are wound to the desired length of the belt 10 so that the relative locations of the inner and outer ends 36a, 36b and 38a, 38b of the cords are as described above. A lower elastomeric carcass layer 52a is then applied to a lower face of the cords 22a, 22b, and an upper elastomeric carcass layer 52b is applied to an upper face of the cords. The elastomeric layers 52a, 52b comprise calendered rubber, which may be fiber loaded. An upper transverse layer subassembly 54b is then applied to the upper carcass layer 52b. The upper transverse layer subassembly 54b includes a sheet of calendered rubber 56b and the side-by-side transverse upper cords 26 on one surface of the sheet. The upper transverse layer subassembly 54b is applied to the upper carcass layer 52a so that the transverse cords 26 are disposed between the sheet of calendered rubber 56b and the upper carcass layer. Likewise, a lower transverse layer subassembly 54a is applied to the lower carcass layer 52a. Like the upper transverse layer subassembly 54b, the lower transverse layer subassembly 54a includes a sheet of calendered rubber 56a and the side-by-side transverse cords 20 on one surface of the sheet. The lower transverse layer subassembly 54a is applied to the lower carcass layer 52a so that the transverse cords 28 are disposed between the sheet of calendered rubber 56a and the lower rubber carcass layer. Finally, a top layer 58 of calendered rubber having the upper embossed surface 34 is applied to the upper transverse layer subassembly 52b.

The belt subassembly 49 is cured so that the respective layers 52a, 52b, 56a, 56b, 58 and cords 22a, 22b, 26, 28 are formed into the integral belt 10, and the respective cords being embedded in the corresponding matrices 24, 30, 32, as described above and shown in FIGS. 1-6. The upper and lower carcass layers 52a, 52b form the carcass matrix 16. The upper carcass layer 52a and the upper transverse layer 56b form the upper transverse matrix 30, while the lower carcass layer 52b and the lower transverse layer 56a form the lower transverse matrix 32. Other ways of assembling the belt to form the appropriate matrices are within the scope of the invention. In one example, the belt 10 may be cured in an endless belt vulcanizing press, as is generally known in the art. Other ways of curing the belt 10 are within the scope of the invention. Moreover, the belt 10 may be assembled in other ways without departing from the scope of the invention.

Figure 8:
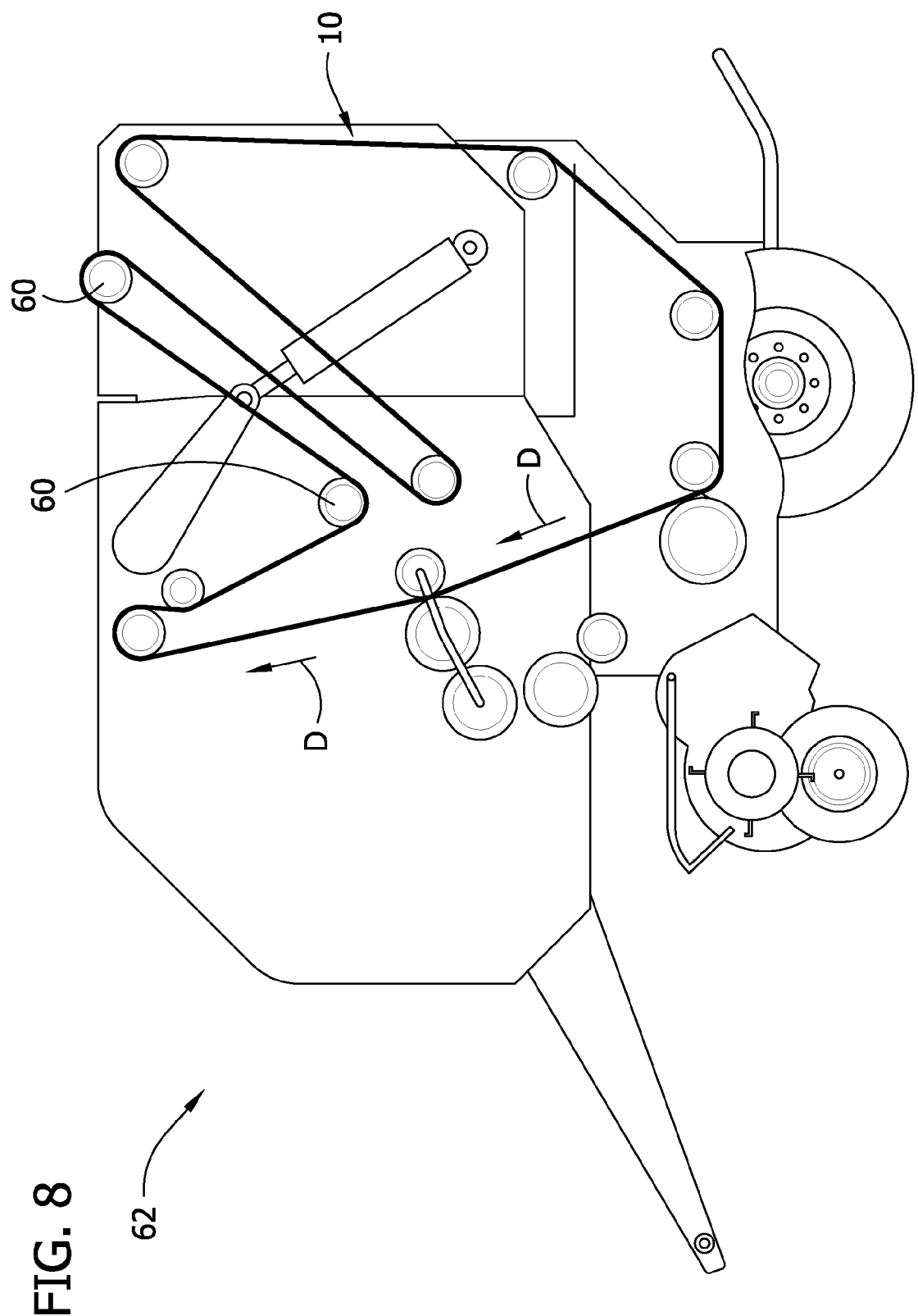
FIG. 8 is a schematic of an interior of a hay baler with the belt of FIG. 1 being received around rollers in the interior of the baler.

Referring to FIG. 8, in a preferred use a plurality of the baler belts 10 (e.g., eight) are wrapped around a series of rollers 60 within a hay baler, generally indicated at 62. The belts 10 are driven around the rollers 60 in a direction of travel, as indicated by arrows D (see also, FIGS. 5 and 6). As the hay baler 62 picks up hay, the belts 10 compress the hay into round bundles. The belts 10 are preferably mounted on the rollers 60 so that the outer ends 38*a*, 38*b* of the carcass cords 22*a*, 22*b* are protected by the opposing part of the respective laterally outermost turn 46*a*, 46*b*. In other words, each of the first ends 38*a*, 38*b* of the carcass cords 22*a*, 22*b* lead at least a part of the respective transition portion 50*a*, 50*b* of the respective laterally outermost turn 46*a*, 46*b* (see, FIGS. 5 and 6). That is, the first ends 38*a*, 38*b* will pass one of the rollers 60 before the entirety of the respective transition portion 50*a*, 50*b* passes the roller. In the illustrated embodiment, each of the first ends 38*a*, 38*b* of the carcass cords 22*a*, 22*b* lead the entire respective transition portion 50*a*, 50*b* of the respective laterally outermost turn 46*a*, 46*b*. In this way, it is less likely that debris, such as shards from broken bottles, will catch on the outer ends 38*a*, 38*b* of the carcass cords 22*a*, 22*b* and pull them out of the body 12 (i.e., fray), causing failure of the belt 10. Thus, the belt 10 has a preferred direction of travel as described. The belt 10 includes arrows 64 (broadly, indicia; FIG. 1) indicative of the preferred direction of travel of the belt 10, so that a person installing the belt and/or replacing the belt is cognizant of the preferred direction of travel.

Figure 9:
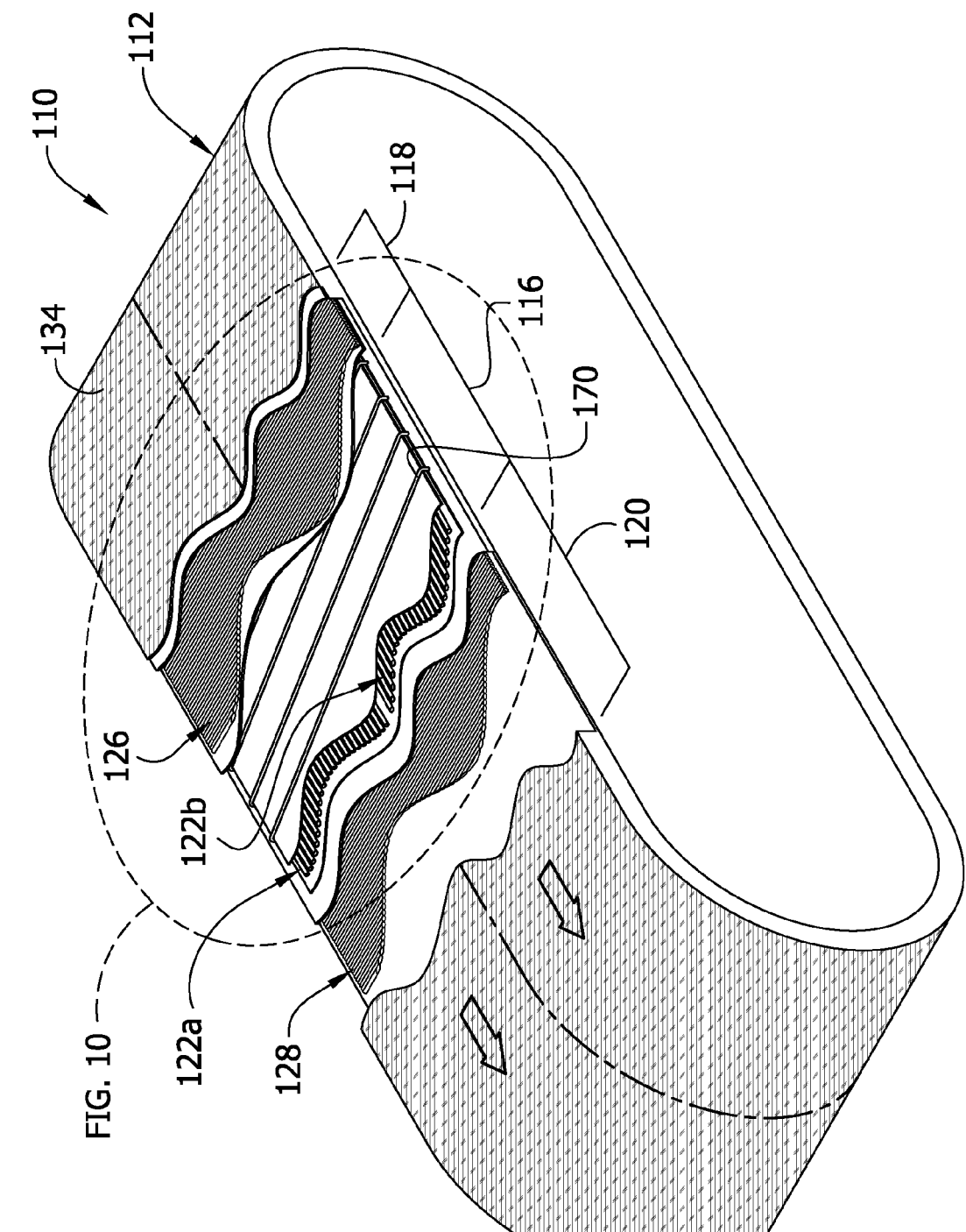
FIG. 9 is a perspective of a second embodiment of an endless elastomeric belt with parts broken away to show internal construction.
Figure 10:
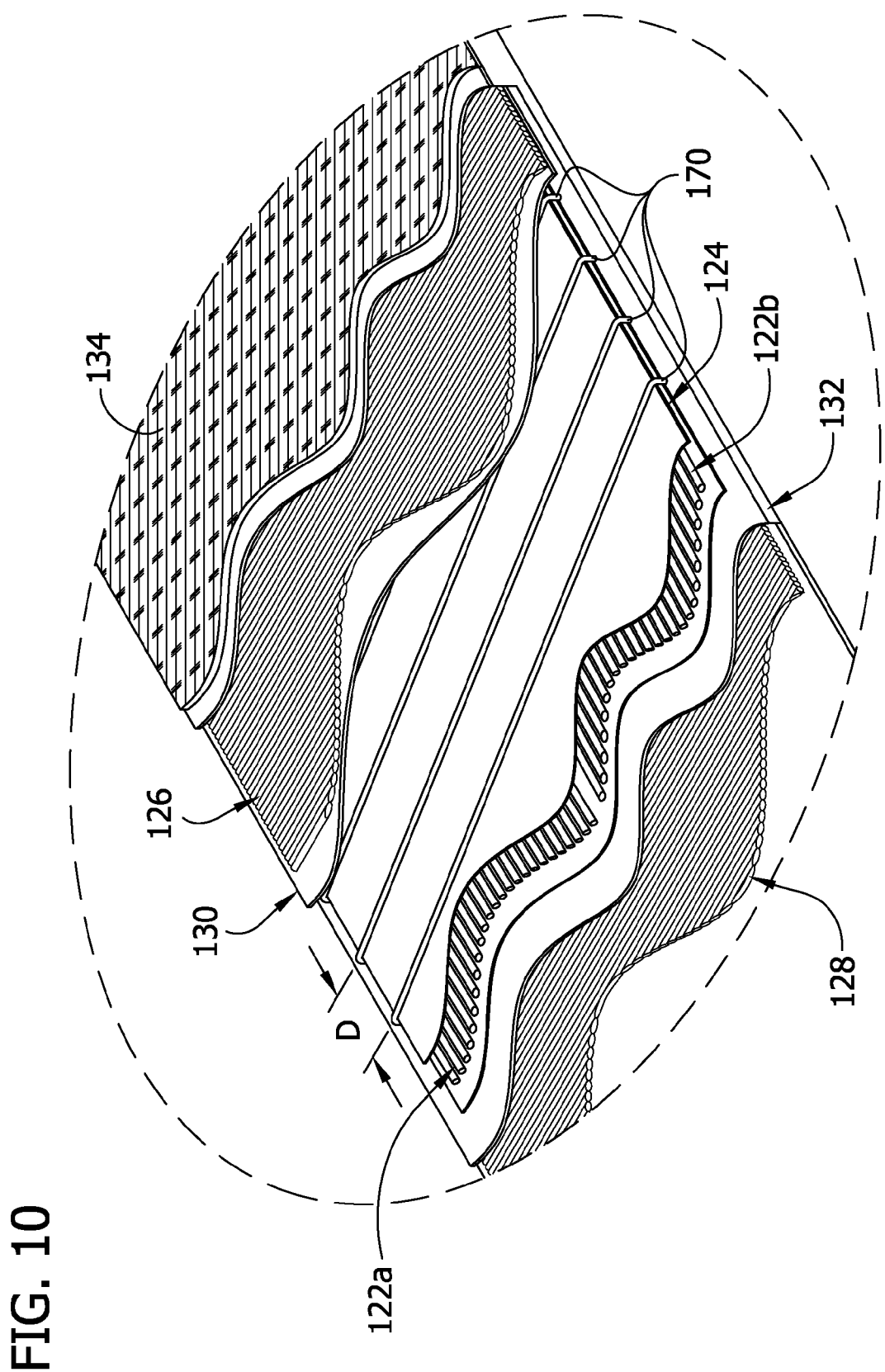
FIG. 10 is an enlarged fragmentary view of the belt in FIG. 9.
Figure 11:
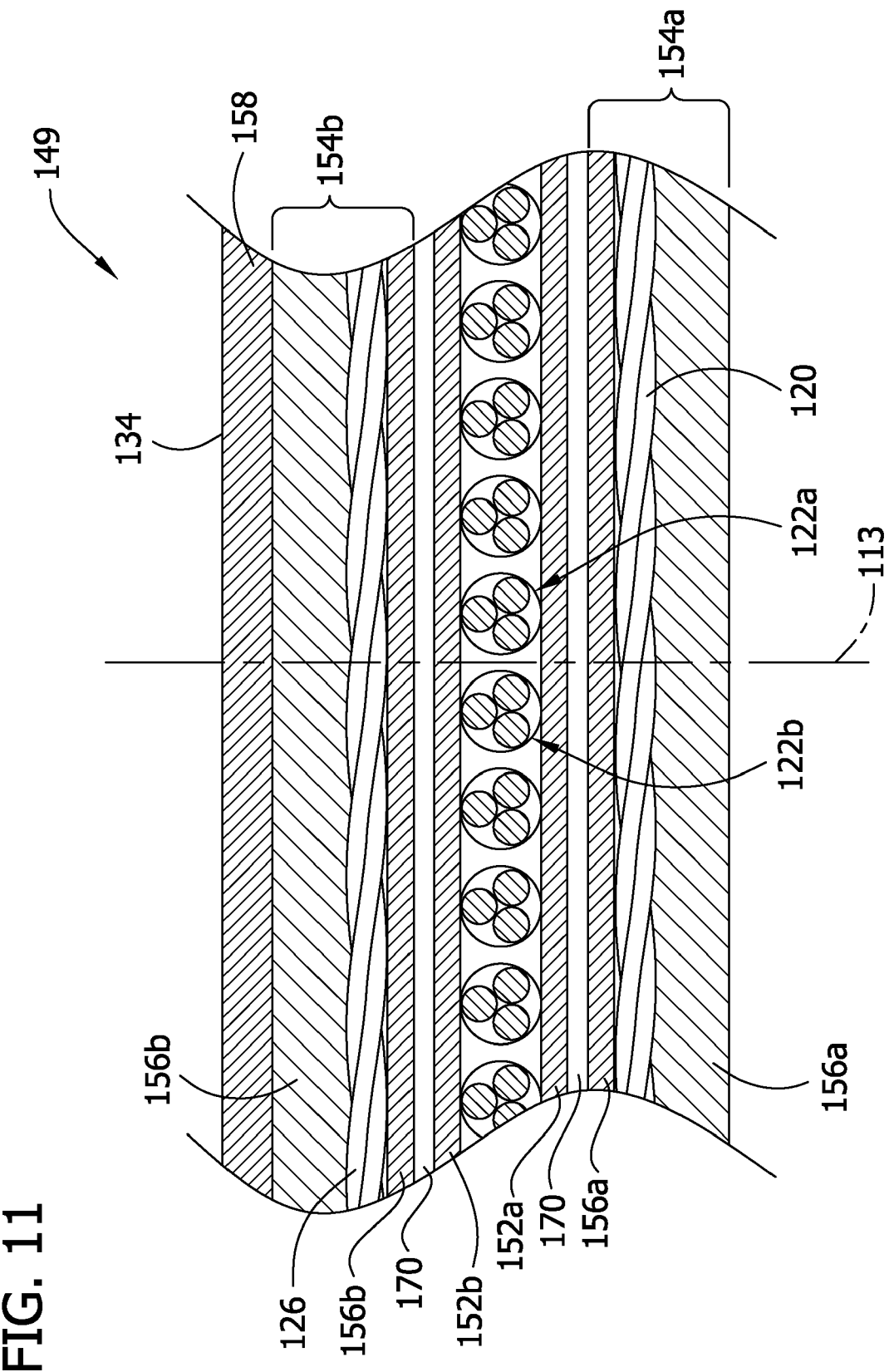
FIG. 11 is a fragmentary section of a subassembly of the belt in FIG. 9.

Referring to FIGS. 9-11, a second embodiment of an endless elastomeric belt is generally indicated at 110. This belt is similar to the belt 10 disclosed above and illustrated in FIGS. 1-8, and, like components are indicated by corresponding reference numerals plus 100. A body 112 of the belt 110 extends in an endless loop around a length or circumference of the belt. The belt 110 includes a carcass 116 sandwiched between upper and lower transverse layers 118, 120, respectively. It is understood that the belt 110 may not include the transverse layers 118, 120 without departing from the scope of the present invention. The carcass 116 includes a pair of carcass cords 122*a*, 122*b* embedded in an elastomeric matrix, generally indicated at 124 (FIG. 10), and arranged in the same manner disclosed above with respect to the first belt 10. It is understood, however, that the belt 110 may include only one carcass cord or more than two carcass cords and/or the carcass cords may be arranged in other ways without departing from the scope of the present invention. The transverse layers 118, 120 each include a plurality of upper and lower transverse cords 126, 128, respectively, each embedded in respective elastomeric matrices, generally indicated at 130, 132, respectively (FIG. 10). An upper surface 134 of the belt 110 has an embossed pattern for gripping hay as it is being bailed. It is understood that the upper surface 134 may not be embossed without departing from the scope of the present invention.

The difference between the present belt 110 and the belt 10 disclosed in FIGS. 1-8 is that the present belt includes an elongate binder 170 extending around lateral edges of the elastomeric matrix 124 of the carcass 116, generally transverse to the centerline of the body 112. The purpose of the binder 170 is described in detail below. In the illustrated embodiment in FIGS. 9-11, the binder 170 is wound helically in multiple turns around the matrix 124 and runs along the circumference of the belt 110. In one example and without being limiting, the binder 170 runs along substantially an entirety of the circumference of the belt 110. Also in one example and without being limiting, adjacent turns of the binder 170 may be spaced apart a distance D that is within a range of about 1 cm (2.54 in) to about 3 cm (1.18 in). It is understood that adjacent turns of the binder 170 may be spaced apart other distances or may be substantially adjoining without departing from the scope of the present invention. In one non-limiting example, the binder 170 may comprise a single thread, although it may comprise more than one thread without departing from the scope of the present invention. The binder thread may comprise a plurality of yarns, such as between about 3 and about 9 adhesive dipped polyester yarns. In another non-limiting example, the binder 170 may comprise a cord, such as a cord made from one or more threads, each of which may comprise a plurality of yarns, such as between about 3 and about 9 adhesive dipped polyester yarns. The binder 170 may comprise of other components and materials without departing from the scope of the present invention.

The binder 170 is used to maintain the desired arrangement of the carcass cords 122*a*, 122*b* relative to a lower elastomeric carcass layer 152*a* and an upper elastomeric carcass layer 152*b* as the belt 110 is being manufactured and cured. For example, referring to FIG. 11 in one example of a method of making the belt 110, a belt subassembly, generally indicated at 149, is formed. The first and second carcass cords 122*a*, 122*b* are wound to the desired length of the belt 110 so that the relative locations of the inner and outer ends of the cords are as described above with respect to FIGS. 1-8. The lower elastomeric carcass layer 152*a* is then applied to a lower face of the cords 122*a*, 122*b*, and the upper elastomeric carcass layer 152*b* is applied to an upper face of the cords. The elastomeric carcass layers 152*a*, 152*b* comprise calendered rubber, which may be fiber loaded. (The carcass layers 152*a*, 152*b* will become the elastomeric matrix 124 during curing.)

Next, with the carcass cords 122*a*, 122*b* sandwiched between the upper and lower carcass layers 152*a*, 152*b*, the binder 170 is wound around the carcass layers 152*a*, 152*b* to apply a compression force to the carcass layers and the carcass cords that substantially prevents the cords from shifting or moving relative to the carcass layers. As described above, the binder may be wound helically in multiple turns around the carcass layers 152*a*, 152*b* and may run along at least a portion of the circumference of the belt 110. As also described above, in one non-limiting example, adjacent turns of the binder 170 may be spaced apart a distance D that is within a range of about 1 cm (2.54 in) to about 3 cm (1.18 in).

After applying the binder 170, an upper transverse layer subassembly 154*b* may then be applied to the upper carcass layer 152*b*. The upper transverse layer subassembly 154*b* includes opposing sheets 156*b* of calendered rubber, which may be fiber loaded, and the side-by-side transverse upper cords 126 sandwiched between the sheets. The upper transverse layer subassembly 154*b* is applied to the upper carcass layer 152*a*. Likewise, a lower transverse layer subassembly 154*a* is applied to the lower carcass layer 152*a*. Like the upper transverse layer subassembly 154*b*, the lower transverse layer subassembly 154*a* includes opposing sheets 156*a* of calendered rubber and the side-by-side transverse cords 120 sandwiched between the sheets. The lower transverse layer subassembly 154*a* is applied to the lower carcass layer 152*a*. Finally, a top layer 158 of calendered rubber having the upper embossed surface 134 is applied to the upper transverse layer subassembly 152*b*. Throughout this assembly process, the binder 170 maintains desired arrangement of the carcass cords 122*a*, 122*b* relative to a lower elastomeric carcass layer 152*a* and an upper elastomeric carcass layer 152*b*.

The belt subassembly 149 is cured so that the respective layers 152*a*, 152*b*, 156*a*, 156*b*, 158 and cords 122*a*, 122*b*, 126, 128 are formed into the integral belt 110, and the respective cords being embedded in the corresponding matrices 124, 130, 132, as described above and shown in FIGS. 9 and 10. As stated above, the binder 170 maintains desired arrangement of the carcass cords 122*a*, 122*b* relative to a lower elastomeric carcass layer 152*a* and an upper elastomeric carcass layer 152b during the curing process. The upper and lower carcass layers 152a, 152b form the carcass matrix 116. The upper carcass layer 152a and the upper transverse layer 156b form the upper transverse matrix 130, while the lower carcass layer 152b and the lower transverse layer 156a form the lower transverse matrix 132. Other ways of assembling the belt to form the appropriate matrices are within the scope of the invention. In one example, the belt 110 may be cured in an endless belt vulcanizing press, as is generally known in the art. Other ways of curing the belt 110 are within the scope of the invention. Moreover, the belt 110 may be assembled in other ways without departing from the scope of the invention.

Figure 12:
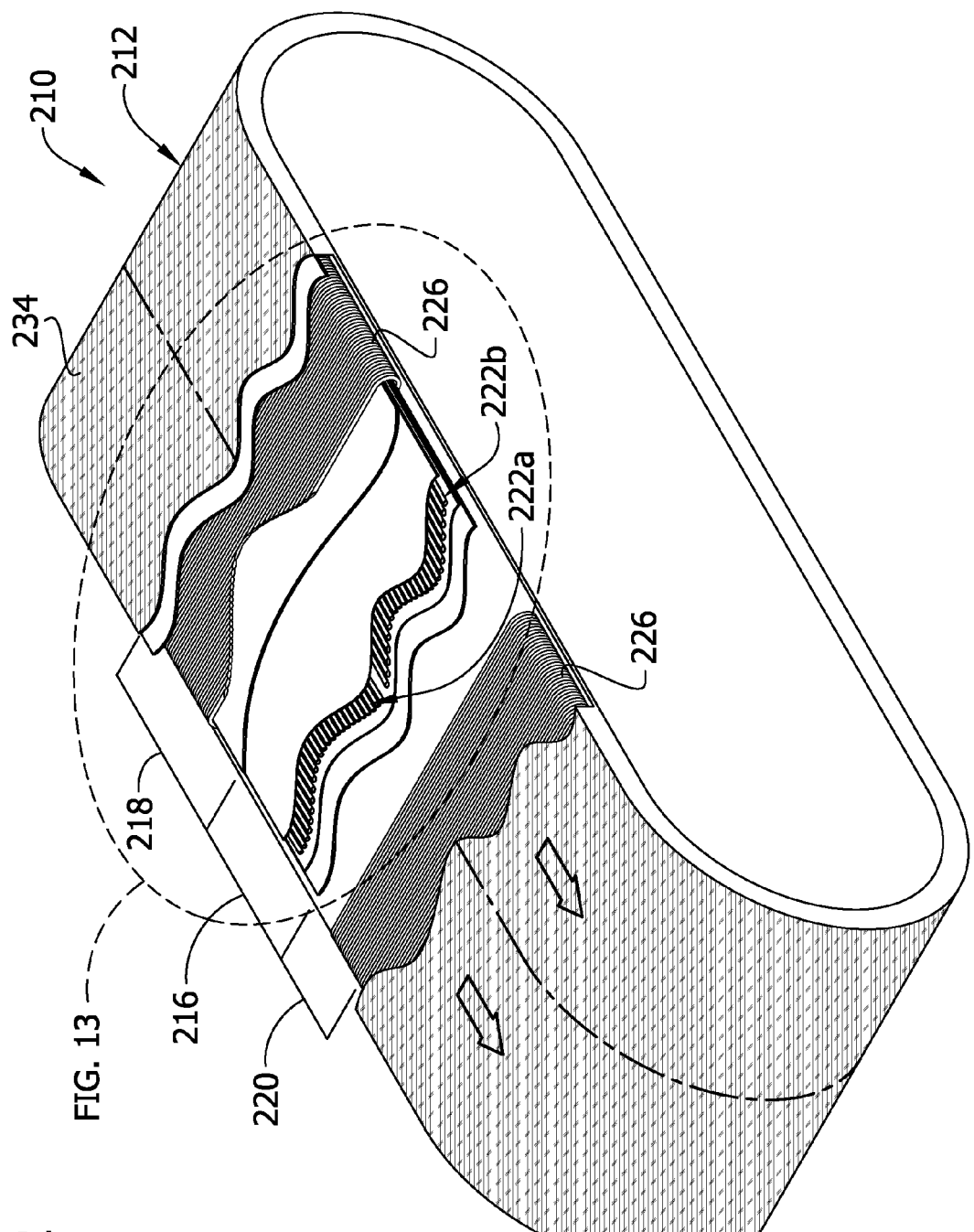
FIG. 12 is a perspective of a third embodiment of an endless elastomeric belt with parts broken away to show internal construction.
Figure 13:
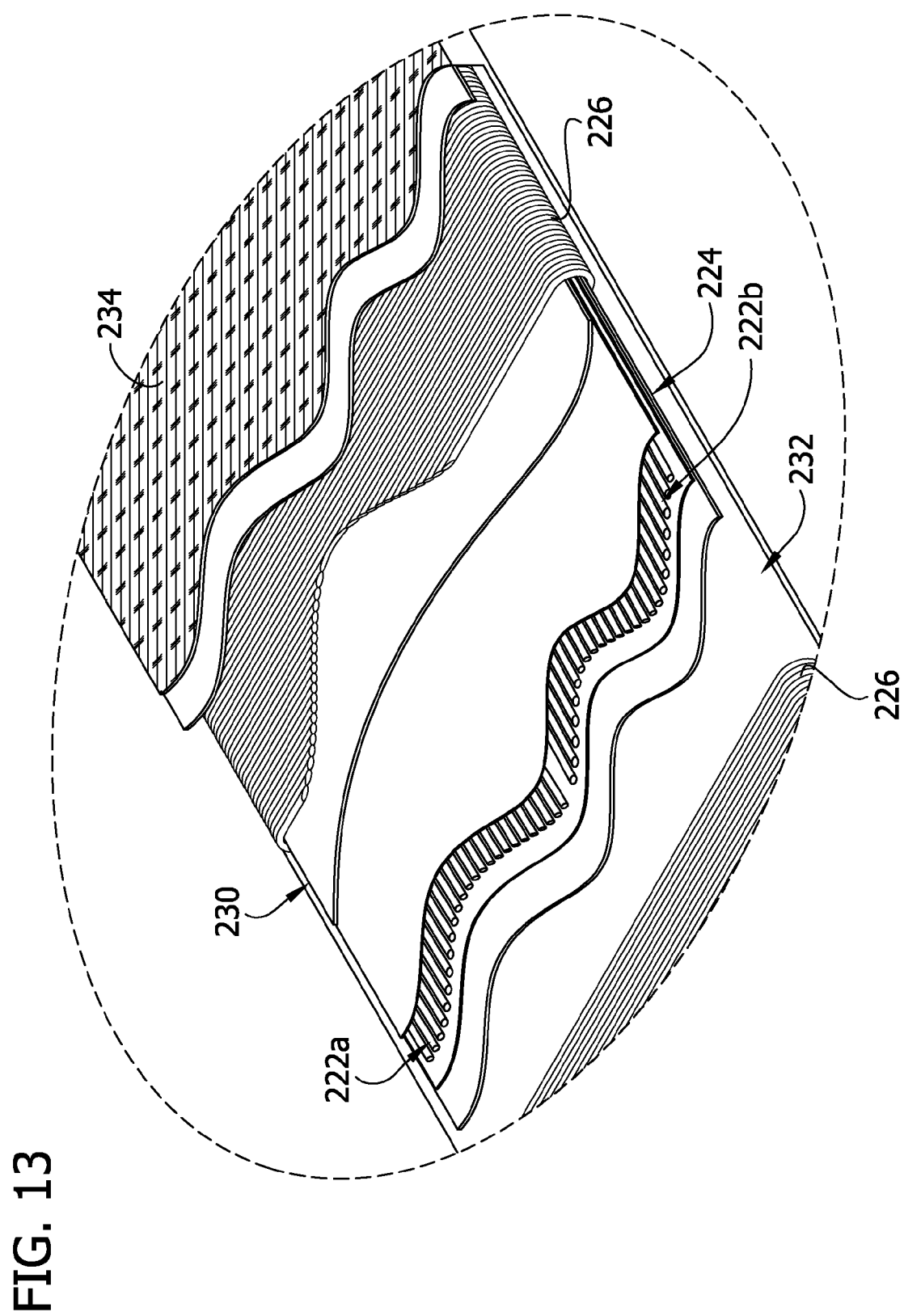
FIG. 13 is an enlarged fragmentary view of the belt in FIG. 12.
Figure 14:
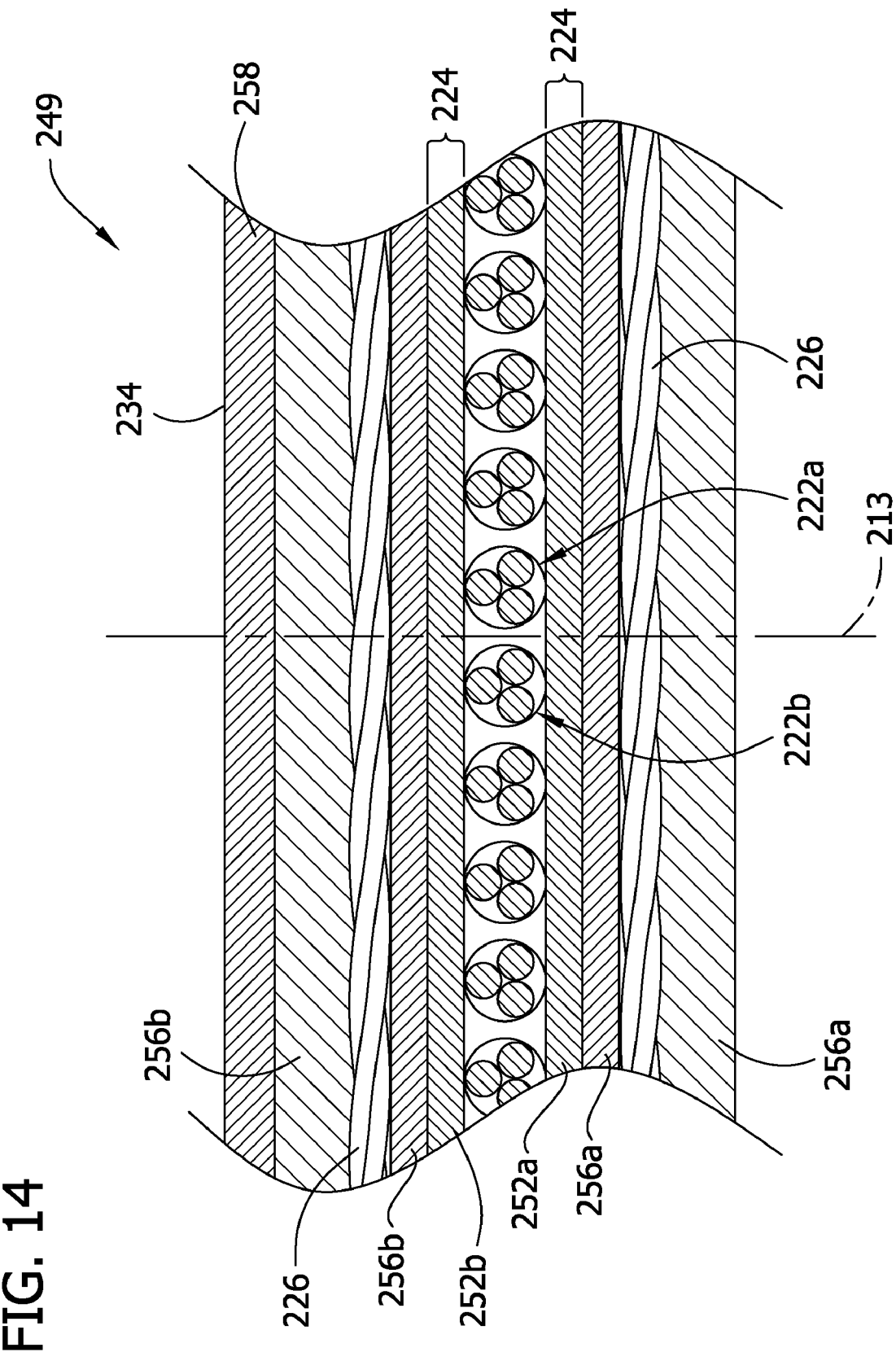
FIG. 14 is a fragmentary section of a subassembly of the belt in FIG. 12.

Referring to FIGS. 12-14, a third embodiment of an endless elastomeric belt is generally indicated at 210. This belt is similar to the belt disclosed above and illustrated in FIGS. 1-8, and therefore, like component are indicated by corresponding reference numerals plus 200. A body 212 of the belt 210 extends in an endless loop around a length or circumference of the belt. The belt 210 includes a carcass 216 sandwiched between upper and lower transverse layers 218, 220, respectively. The carcass 116 includes a pair of carcass cords 222a, 222b embedded in an elastomeric matrix 224 and arranged in the same manner disclosed above with respect to the first belt 10. It is understood, however, that the belt 210 may include only one carcass cord or more than two carcass cords, and/or the carcass cords may be arranged in other ways without departing from the scope of the present invention. An upper surface 234 of the belt 110 has an embossed pattern for gripping hay as it is being bailed. It is understood that the upper surface 234 may not be embossed without departing from the scope of the present invention.

The difference between the present belt 210 and the belt disclosed in FIGS. 1-8 is that the present belt includes a transverse cord 226 (broadly, a binder) wrapped around the elastomeric matrix, generally indicated at 224, of the carcass 216, extending around lateral edges of the elastomeric matrix, generally transverse to the centerline of the body 212. In the illustrated embodiment in FIGS. 12-14, the transverse cord 226 is wound helically in multiple turns around the matrix 224 and runs along the circumference of the belt 210. In one non-limiting example, the transverse cord 226 runs along substantially an entirety of the circumference of the belt 210. Also in one non-limiting example, adjacent turns of the transverse cord 226 are substantially adjoining, although it is understood that adjacent turns may be spaced apart a distance D that is within a range of about 1 cm (2.54 in) to about 3 cm (1.18 in) without departing from the scope of the present invention. In one non-limiting example, the transverse cord 226 may be constructed of the same materials as given above with respect to the embodiment in FIGS. 1-8. The transverse cord 226 may comprise other components and materials without departing from the scope of the present invention.

The transverse cord 226 in the present embodiment both reinforces the belt 210, like the transverse cords 26, 28 in the first embodiment, and maintains the desired arrangement of the carcass cords 222a, 222b relative to a lower elastomeric carcass layer 252a and an upper elastomeric carcass layer 252b during assembly of the belt and as the belt 210 is cured, like the binder 170 in the second embodiment. As a non-limiting example, referring to FIG. 14 in one method of making the belt 210, a belt subassembly, generally indicated at 249, is formed. The first and second carcass cords 222a, 222b are wound to the desired circumference of the belt 210 so that the relative locations of the inner and outer ends of the cords are as described above with respect to FIGS. 1-8. The lower elastomeric carcass layer 252a is then applied to a lower face of the cords 222a, 222b, and the upper elastomeric carcass layer 252b is applied to an upper face of the cords. The elastomeric carcass layers 252a, 252b comprise calendared rubber, which may be fiber loaded. (The carcass layers 252a, 252b will become the elastomeric matrix 224 during curing.)

Next, with the carcass cords 222a, 222b sandwiched between the upper and lower carcass layers 252a, 252b, upper and lower transverse layers 256a, 256b, are applied to the respective upper and lower carcass layers 252a, 252b, respectively. The transverse cord 226 (broadly, a binder) is then wrapped around the upper and lower transverse layers 256a, 256b extending around lateral edges of the respective layers, generally transverse to the centerline of the body 212. In effect, the transverse cord 226 is also wrapped around the upper and lower carcass layers 252a, 252b and the carcass cords 222a, 222b to maintain the desired arrangement of the carcass cords relative to the lower elastomeric carcass layer 252a and the upper elastomeric carcass layer 252b. In one non-limiting example given above, the transverse cord 226 is wound helically in multiple turns around the upper and lower transverse layers 256a, 256b and runs along the circumference of the belt 210. In one non-limiting example, the transverse cord 226 is wound around the belt along substantially an entirety of the circumference of the belt 210. Also in one non-limiting example, adjacent turns of the transverse cord 226 are substantially adjoining.

After applying the transverse cord 226, an upper transverse sheet 256a, such as a sheet of calendared rubber, may be applied over the transverse cord, and a lower transverse sheet 256b, such as a sheet of calendared rubber, may be applied under the transverse cord. A top layer 258 of calendered rubber having the upper embossed surface 234 may be applied over the upper transverse sheet 256a.

Finally, the belt subassembly 249 is cured to form the subassembly into the integral belt 210. Other ways of assembling the belt to form the appropriate matrices are within the scope of the invention. In one example, the belt 210 may be cured in an endless belt vulcanizing press, as is generally known in the art. Other ways of curing the belt 210 are within the scope of the invention. Moreover, the belt 210 may be assembled in other ways without departing from the scope of the invention.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:
1. An endless elastomeric belt comprising:
a body extending in an endless loop around a circumference of the belt, the body having a centerline extending around the circumference, and opposite lateral edges;
a carcass in the body, the carcass including
an elastomeric matrix extending in an endless loop around the circumference of the belt, the matrix having opposite lateral edges defining a width of the matrix, and
a carcass cord within the matrix extending in multiple turns around the circumference of the belt; and
an elongate binder extending around the lateral edges of the matrix generally transverse to the centerline of the body.

2. The endless elastomeric belt as set forth in claim 1 wherein the elongate binder is wound helically in multiple turns and runs along the circumference of the belt.

3. The endless elastomeric belt as set forth in claim 2 wherein the elongate binder comprises a binder thread.

4. The endless elastomeric belt as set forth in claim 3 wherein the binder thread runs along substantially an entirety of the circumference of the body.

5. The endless belt as set forth in claim 4 wherein the carcass cord constitutes a first carcass cord, the endless belt further comprising a second carcass cord located generally within the body and extending generally circumferentially in multiple turns around the body, the second carcass cord including an inner end and an outer end, the inner end being located nearer to the centerline of the body than the outer end, and the outer end being located nearer to one of the opposite longitudinal edges of the body that is remote from the outer end of the first carcass cord, the second carcass cord including a laterally outermost turn containing the outer end and being located nearest said one longitudinal edge of the body, the outer end of the second cord being located in a position which is not substantially laterally outward of other portions of the laterally outermost turn of the second carcass cord.

6. The endless elastomeric belt as set forth in claim 3 wherein adjacent turns of the multiple turns of the binder thread are spaced apart between about 1 cm and about 3 cm along the circumference of the body.

7. The endless elastomeric belt as set forth in claim 2 wherein the elongate binder comprises a transverse cord.

8. The endless elastomeric belt as set forth in claim 7 wherein the transverse cord runs along substantially an entirety of the circumference of the body.

9. The endless elastomeric belt as set forth in claim 8 wherein adjacent turns of the multiple turns of the transverse cord are substantially adjoining.

10. The endless elastomeric belt as set forth in claim 1 wherein the carcass cord includes an inner end and an outer end, the inner end being located nearer to the centerline of the body than the outer end, and the outer end being located nearer to one of the opposite lateral edges of the body, the carcass cord including a laterally outermost turn containing the outer end and being located nearest said one lateral edge of the body,
the laterally outermost turn includes a first portion in which the carcass cord extends substantially parallel to the centerline of the body and a second portion in which the carcass cord extends at an angle with respect to the centerline of the body,
the outer end of the carcass cord being located in a position which is not substantially laterally outward of the first portion of the laterally outermost turn of the carcass cord.

11. The endless belt as set forth in claim 10 wherein the outer end of the carcass cord is substantially aligned with a longitudinally opposing part of the laterally outermost turn.

12. The endless elastomeric belt as set forth in claim 1, wherein the elongate binder comprises one of a thread and a cord wound around the lateral edges of the matrix.

13. The endless elastomeric belt as set forth in claim 12, wherein said one of a thread and a cord is wound helically in multiple turns and runs along the circumference of the belt.

14. A baler comprising:
a series of rollers driven about generally parallel rotational axes;
an endless elastomeric belt received around the rollers so that the rollers drive the belt in a direction of travel, the elastomeric belt comprising
a body extending in an endless loop around a circumference, the body having a centerline extending around the circumference,
a carcass including
an elastomeric matrix having opposite lateral edges defining a width of the matrix,
first and second carcass cords embedded in the matrix, the first and second carcass cords being wound generally along the direction of travel, each carcass cord having a first end generally adjacent to a center of the width of the matrix and a second end generally adjacent to one of the edges of the matrix, each carcass cord having a laterally outermost turn including the outer end, the laterally outermost turn of each carcass cord extending generally in the direction of the travel of the belt at a primary portion and extending at an angle with respect to the direction of travel at a transition portion, each of the first ends of the carcass cords leading at least a part of the transition portion of the respective laterally outermost turn with respect to one of the rollers as the belt is driven on the rollers, and
an elongate binder extending around the lateral edges of the matrix generally transverse to the centerline of the body.

15. The baler as set forth in claim 14 wherein the first carcass cord is wound in a Z-direction along the circumference of the belt, the first carcass cord comprising at least two threads wound in the Z-direction, and wherein the second carcass cord is wound in an S-direction along the circumference of the belt, the second carcass cord comprising at least two threads wound in the S-direction.

16. The baler as set forth in claim 14, wherein the elongate binder comprises one of a thread and a cord wound around the lateral edges of the matrix.

17. The baler as set forth in claim 16, wherein said one of a thread and a cord is wound helically in multiple turns and runs along the circumference of the belt.

18. An endless elastomeric belt comprising:
a carcass including
an elastomeric matrix extending in an endless loop around a circumference, the matrix having a centerline and opposite lateral edges,
a first cord generally within the matrix, the first cord being wound in a Z-direction along the circumference of the belt and having an inner end generally adjacent to the centerline of the matrix and an outer end generally adjacent to one of the opposite lateral edges of the matrix, the first cord comprising at least two threads wound in the Z-direction,
a second cord generally within the matrix, the second cord being wound in an S-direction along the circumference of the belt and having an inner end generally adjacent to the centerline of the matrix and an outer end generally adjacent to one of the opposite lateral edges of the matrix remote from the outer end of the first cord, the second cord comprising at least two threads wound in the S-direction; and
an elongate binder extending around the lateral edges of the matrix generally transverse to the centerline of the matrix.

19. The endless elastomeric belt as set forth in claim 18, wherein the elongate binder comprises one of a thread and a cord wound around the lateral edges of the matrix.

20. The endless elastomeric belt as set forth in claim 19, wherein said one of a thread and a cord is wound helically in multiple turns and runs along the circumference of the belt.

* * * * *